US010164897B1

(12) United States Patent
Gussin et al.

(10) Patent No.: US 10,164,897 B1
(45) Date of Patent: Dec. 25, 2018

(54) SYSTEM AND METHOD FOR HOST ISOLATION IN A WEB-BASED COMPUTING SYSTEM

(71) Applicant: AMAZON TECHNOLOGIES, INC., Seattle, WA (US)

(72) Inventors: Bradley Joseph Gussin, Seattle, WA (US); Pratik Ramdharne, Seattle, WA (US); Qiang Du, Seattle, WA (US); Chen Yang, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 163 days.

(21) Appl. No.: 15/195,962

(22) Filed: Jun. 28, 2016

(51) Int. Cl.
*G06F 15/173* (2006.01)
*H04L 12/911* (2013.01)
*H04L 29/08* (2006.01)

(52) U.S. Cl.
CPC .............. *H04L 47/70* (2013.01); *H04L 67/02* (2013.01)

(58) Field of Classification Search
CPC ............... G06F 9/45558; G06F 9/5077; G06F 2009/45579; G06F 2009/45575; G06F 9/00; G06F 2009/4557; G06F 2009/45583; G06F 21/629; G06F 2201/815; G06F 9/45533; G06F 11/203; G06F 12/1081; G06F 12/126; G06F 2201/805; G06F 2212/151; H04L 47/70; H04L 67/02
See application file for complete search history.

(56) References Cited

U.S. PATENT DOCUMENTS

| | | | | |
|---|---|---|---|---|
| 9,274,903 | B1 * | 3/2016 | Garlapati | G06F 11/2002 |
| 9,471,349 | B1 * | 10/2016 | Stone | G06F 9/5077 |
| 2012/0155453 | A1 * | 6/2012 | Vohra | H04L 41/0823 370/352 |
| 2013/0007744 | A1 * | 1/2013 | Arasaratnam | G06F 9/45558 718/1 |
| 2014/0181811 | A1 * | 6/2014 | Tsirkin | G06F 9/45558 718/1 |
| 2015/0355924 | A1 * | 12/2015 | Holla | G06F 9/45558 718/1 |
| 2017/0031622 | A1 * | 2/2017 | Nagarajan | G06F 3/0631 |

* cited by examiner

*Primary Examiner* — Krisna Lim
(74) *Attorney, Agent, or Firm* — Blank Rome LLP

(57) ABSTRACT

A method for removing computing assets from service in a provider network includes receiving, from a requestor, identification for selected ones of the computing assets requested to be removed from service. Each of the computing assets is a computing device or a slot of a computing device. A pool in which each of the computing assets requested to be removed from service is located is identified. For each identified pool: which of the computing assets requested to be removed from service is approved for removal from service is determined based on a number of resource instances available for allocation to users after the computing devices are removed from service exceeding a predetermined number of resource instances. The requestor is notified as to which of the computing assets is approved for removal from service.

19 Claims, 11 Drawing Sheets

100
PROVIDER NETWORK 102
AVAILABILITY ZONE 106
HOST POOL 108
HOST 110
INSTANCE 112
CAPACITY MANAGER 114
NETWORK CAPACITY INFORMATION 132
HOST INFORMATION SERVICE 116
HOST CONFIGURATION 130
HOST IDENTIFICATION SERVICE 118
HOST ADDRESSES 128
ISOLATION MANAGER 120
INTERFACE MANAGER 122
INTERNET 124
USER 126

600
FOR EACH POOL
602
DETERMINE NUMBER OF INSTANCES AVAILABLE FOR ALLOCATION WITH ISOLATION OF REQUESTED HOSTS (SUPPLY)
604
DETERMINE NUMBER OF INSTANCES NEEDED BY USERS (DEMAND)
606
DEMAND>SUPPLY?
608
Y
DENY REQUEST
612
N
GRANT REQUEST
610

Computing System 1080
Network 1070
Data Center 1060
System Manager 1050
Rack 1005
Rack Support 1022
VM
...
VM
Node Manager (NM)
Server 1010N
VM
...
VM
Node Manager (NM)
Server 1010B
VM
...
Virtual Machine Instance (VM)
Node Manager (NM) 1015
Server 1010A
Computing System 1045
System Manager 1040
Node Manager 1025
Computing System 1035
VM
...
VM
Computing System 1030N
...
Computing System 1030A
Data Center 1000
1020

SYSTEM AND METHOD FOR HOST ISOLATION IN A WEB-BASED COMPUTING SYSTEM

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers. However, as the scale and scope of typical data centers has increased, the tasks of provisioning, administering, and managing the physical computing resources have become increasingly complicated.

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical computing machine to be shared among multiple users by providing each user with one or more virtual machines hosted by the single physical computing machine, with each such virtual machine being a software simulation acting as a distinct logical computing system that provides users with the illusion that they are the sole operators and administrators of a given hardware computing resource, while also providing application isolation and security among the various virtual machines. Furthermore, some virtualization technologies are capable of providing virtual resources that span two or more physical resources, such as a single virtual machine with multiple virtual processors that spans multiple distinct physical computing systems. As another example, virtualization technologies may allow data storage hardware to be shared among multiple users by providing each user with a virtualized data store which may be distributed across multiple data storage devices, with each such virtualized data store acting as a distinct logical data store that provides users with the illusion that they are the sole operators and administrators of the data storage resource.

BRIEF DESCRIPTION OF THE DRAWINGS

For a detailed description of various examples, reference will now be made to the accompanying drawings in which.

DETAILED DESCRIPTION

Figure 1:
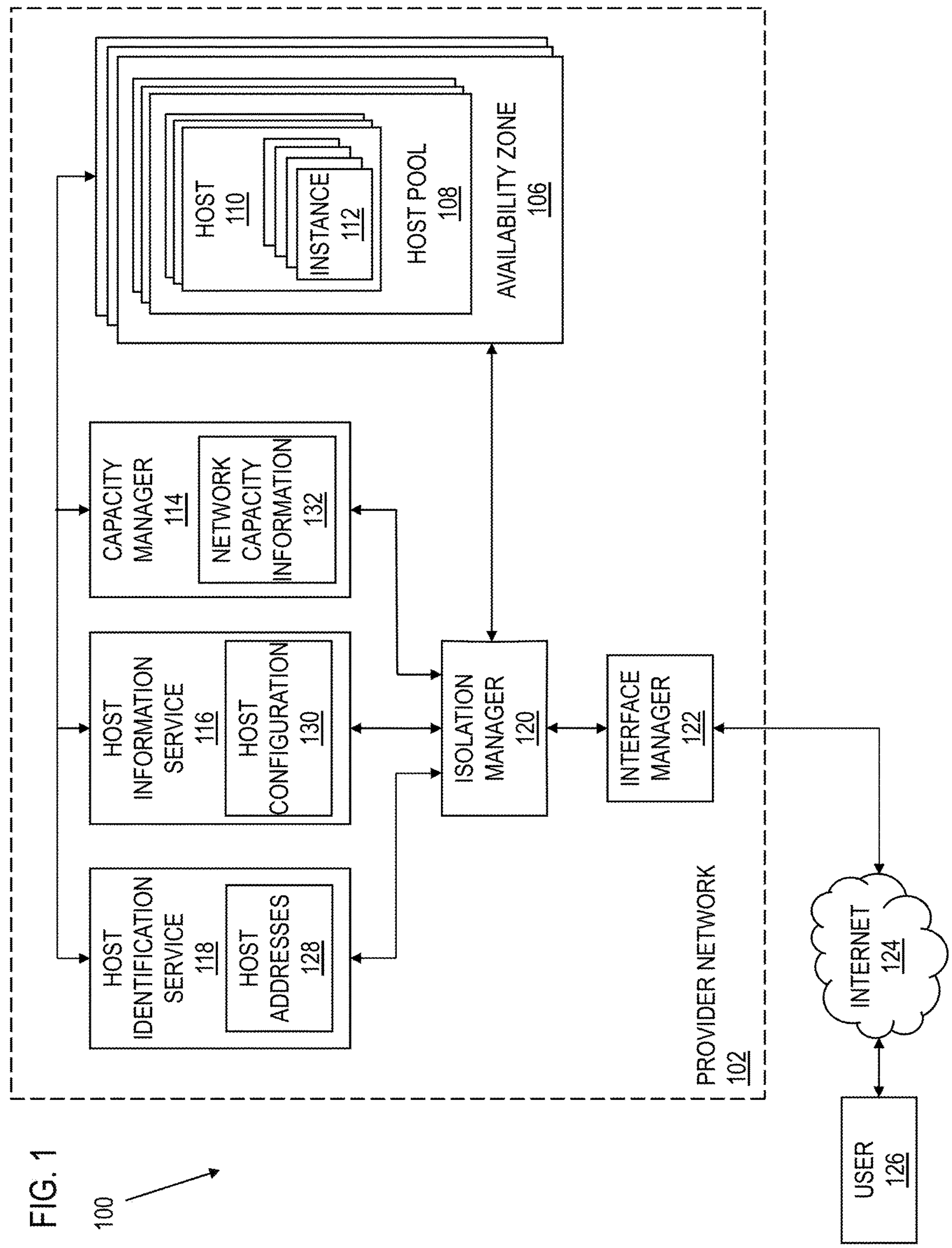
FIG. 1 shows an illustrative web-based computing system that includes host isolation management in accordance with various examples.

Various embodiments of methods and apparatus for determining whether computing resources can be removed from service without disrupting service provided to one or more users of a computing system are described herein. Networks set up by an entity such as a service provider company or a public sector organization to provide one or more services (such as various types of cloud-based computing or storage) accessible via the Internet and/or other networks to a distributed set of clients may be termed provider networks in this document. Such a provider network may include numerous data centers hosting various resource pools, such as collections of physical and/or virtualized computer servers, storage devices, networking equipment and the like, needed to implement and distribute the infrastructure and services offered by the provider. The computing resources may in some embodiments be offered to clients in units called "instances," such as virtual or physical compute instances, storage instances, or other resource instances. A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). A number of different types of computing devices may be used singly or in combination to implement the resources of the provider network in different embodiments, including general purpose or special purpose computer servers, storage devices, network devices and the like. In some embodiments a client or user may be provided direct access to a resource instance, e.g., by giving a user an administrator login and password. In other embodiments the provider network operator may allow clients to specify execution requirements for selected client applications, and schedule execution of the applications on behalf of the client on execution platforms (such as application server instances, Java™ virtual machines (JVMs), general purpose or special-purpose operating systems, platforms that support various interpreted or compiled programming languages such as Ruby, Perl, Python, C, C++ and the like, or high-performance computing platforms) suitable for the applications, without for example requiring the client to access an instance or an execution platform directly. A given execution platform may utilize one or more resource instances in some implementations; in other implementations multiple execution platforms may be mapped to a single resource instance.

In some embodiments the provider network may be organized into a plurality of geographical regions, and each region may include one or more availability zones. An availability zone in turn may comprise one or more distinct locations or data centers, engineered in such a way that the resources in a given availability zone are insulated from failures in other availability zones. That is, a failure in one availability zone may not be expected to result in a failure in any other availability zone; thus, the availability profile of a resource instance is intended to be independent of the availability profile of a resource instance in a different availability zone. Clients may be able to protect their applications from failures at a single location by launching multiple application instances in respective availability zones. At the same time, in some implementations, inexpensive and low latency network connectivity may be provided between resource instances that reside within the same geographical region (and network transmissions between resources of the same availability zone may be even faster).

In a provider network, a computing device used to host virtual machine instances may be removed from service (i.e., taken out of a capacity pool so that the computing device won't be used to host virtual machine instances) for a variety of reasons. For example, a computing device may be removed from service to reserve the computing capacity of the device for use at a future time or to process an expected future event; to allow a faulty or outdated computing device to be repaired or updated; to make room for newer and/or higher performance computing device; or to accommodate various other needs. Removing a computing device from service can affect the operation of the provider network by reducing the computing capacity available to customers of the service provider.

In order to mitigate or eliminate the potentially detrimental effects of removing from service a computing device of a provider network, the provider network may implement an isolation manager that analyzes the provider network and determines whether a specific computing device or computing devices can be removed from service without reducing the computing capacity needed to process a user's workload. The isolation manager may determine whether removal of a computing device from service will affect the capacity of the resource pools to which the computing device contributes computational resources, and determining whether withdrawal of the computational resources from the resource pool may result in an insufficient supply of computational resources to satisfy user demand for computing capacity.

Each computing device may include computational resources sufficient to support a number of resource instances (e.g., a number of virtual machines that are individually assignable to clients). For example, a computing device may include resources, such as processors with associated memory and other computer hardware. In an example embodiment, the service provider may organize the resources of a computing device into "computing slots" to manage the capacity of the fleet and when a virtual machine instance is launched it is launched into a computing slot. In some computing devices, each computing slot, and the computational resources assigned to the slot, may be dedicated for use in implementing a single resource instance. In other implementations, computational resources may be shared by multiple resource instances. For example, suppose a computing device has 4 CPUs, 16 GiG of memory and 40 GB of storage. If the service provider wanted to run four equally sized virtual machines on the server, each computing slot would be allocated 1 CPU, 4 GiB of memory, and 10 GB of storage.

The isolation manager may determine the demand for resource instances in a pool based on a variety of factors. For example, determination of demand may be based on resource instances currently allocated to user or reserved for allocation to a user, historical use of resource instances (e.g., mean, median, or peak utilization of resource instances) over a time period, expected future growth in needed computing capacity based on an increase in the number of users or an increased need for computing capacity by current users, and/or other factors. The isolation manager may determine the supply of resource instances available to satisfy user demand based on the computing capacity provided by currently available resource instances, the number of currently available instances to be retired from the pool in a time period, the number of new resource instances to be added to the pool in a time period, the number of repaired or updated resource instances to be added to the pool in a time period, and/or other factors. The isolation manager may grant a request to remove a computing device from the provider network if the isolation manager determines that after removal of the computing device, the supply of computational resources (e.g., resource instances) will exceed or at least meet user demand for computational resources. Similarly, the isolation manager may deny a request to remove a computing device from the provider network if the isolation manager determines that after removal of the computing device, user demand for computational resources will exceed the supply of computational resources.

Embodiments of the invention are generally described herein with respect to removing one or more computing devices from service in a provider network. However, some embodiments may also apply the various operations disclosed herein to remove one or more slots of a computing device from service in the provider network. For example, if one or more slots are identified as requested to be removed from service, the isolation manager may determine the pools to which the slots are assigned and determine whether demand for computational resources in the pools will exceed the supply of computational resources available in the pools if the slots are removed from service. Accordingly, the present disclosure is generally directed to controlling the removal of computing assets from service in a web-based computing system, where the computing assets may be computing devices of the web-based computing system or sub-portions (such as slots) of a computing device. Additional details of the operations of various embodiments of the isolation are provided below in conjunction with the descriptions of FIGS. 1-11.

FIG. 1 shows an illustrative web-based computing system that includes host isolation management in accordance with various examples. The system environment 100 includes a provider network 102 that communicates with a user 126 via the internet 124 or other communication network. In general, the provider network 102 can be implemented by one or more data centers. The user 126 is a computing device capable of communicating with the provider network 102 via the internet 124. For example, the user 126 may be a desktop computer, a notebook computer, a tablet computer, a smartphone, or other device configured to communicate with the provider network 102, using a web browser or other suitable mechanism, via the internet 124.

The provider network 102 can include a plurality of availability zones 106. Each availability zone 106 in turn may comprise one or more distinct locations or data centers, engineered in such a way that the resources in a given availability zone 106 are insulated from failures in other availability zones 106. That is, a failure in one availability zone may not be expected to result in a failure in any other availability zone. Users may be able to protect their applications from failures at a single location by launching multiple application instances in respective availability zones. In some implementations, inexpensive and low latency network connectivity may be provided between resource instances that reside within the same geographical region (and network transmissions between resources of a same availability zone 106 may be even faster). Any or all of the elements of the provider network 102 may be operated in one or more of the availability zones 106.

Each availability zone 106 may include multiple host pools 108, each of which includes a number of hosts 110. A host 110 is a computing device that includes a virtualization system (e.g., a hypervisor) and resources suitable for supporting a number of resource instances 112. As noted above, a set of resources that support a resource instance 112 may be referred to as a slot. For example, each host 110 may include a number of slots, each associated with processors and associated memory, network interfaces, etc. that can execute instructions to provide a virtual machine or other system for use by the user 126. The various resource instances 112 of the different availability zones 106 may be reserved and/or allocated for use by clients (or potential clients) such as user 126. In the illustrated embodiment, provider network 102 also includes an isolation manager 120, an interface manager 122, a host identification service 118, a host information service 116, and a capacity manager 114. In some embodiments the functionality of the interface manager 122 may be implemented by a subcomponent of the isolation manager 120 or other component of the provider network 102. The interface manager 122 may in some embodiments implement one or more programmatic interfaces allowing the user 126 to interact with the provider network 102. For example, the interface manager 122 may provide interfaces that allow the user 126 to interact with the isolation manager 120 or to search for, browse, reserve and acquire resource instances 112 to obtain various types of services, e.g., to run and/or access various applications.

Each host pool 108 may include hosts 110 that differ in capability or configuration from the hosts 110 of another host pool 108. For example, the hosts 110 of a first host pool 108 may be configured to support a first type of resource instance 112, while the hosts 110 of a second host pool 108 may be configured to support a second type of resource instance 112, where the first and second types of resource instances 112 may differ in terms of the quantity or nature of resources provided for use by the client. That is, one type of resource instance 112 may have more computing hardware, such as processors, processor cores, memory, etc., for use by a client than is provided by a different type of resource instance 112. Similarly, capabilities of different types of resource instances 112 may differ. For example, one type of resource instance 112 may execute a WINDOWS operating system, while a different type of resource instance 112 may execute a LINUX operating system.

The host pools 108 may represent logical collections or aggregations, so that, for example, the presence of two hosts 110 in the same pool 108 may not necessarily imply anything about the physical location of the two hosts 110. Although the hosts 110 illustrated in FIG. 1 are shown as belonging to availability zones 106, in other embodiments the provider network 102 may be organized differently: e.g., in some embodiments availability zones may not be implemented. Availability zones 106 may be grouped into geographic regions (not shown in FIG. 1) in some embodiments. Host pools 108 may be implemented within availability zones 106 in some implementations, while in other implementations a host pool 108 may span multiple availability zones 106.

The provider network 102 may include a large number (thousands or millions) of hosts 110 that were built and put into service at different times. At various times and for various reasons, one or more of the hosts 110 may need to be removed from service. Over the operational life of host 110, components of the host 110 may degrade to the extent that performance is affected. Under such conditions, the host 110 may be removed from service to allow for repairs or replacement. Similarly, firmware or software upgrades may be needed during the operational life of the host 110 that require removal of the host 110 from service. In another example, computing capacity is to be reserved for application to an event scheduled to occur sometime in the future. To ensure that the needed computing capacity is reserved for application to the future event, one or more hosts 110 may be removed from service and reinstated at a suitable time to service the event. In a further example, one or more hosts 110 may be removed from service to accommodate the introduction of newer and/or higher performance hosts 110 to a pool. There may be other reasons that a host 110 is removed from service, and the user 126 may request that a host 110 be removed from service for any reason.

Because removing a host 110 from service can reduce the computing capacity available to users, embodiments of the provider network 102 ensure that removal of a host 110 from service does not adversely affect the operation of the provider network and/or the operation of a user's application running on the provider network. Accordingly, a request to remove a host 110 from service may be granted or denied based on the effects that removal of the host 110 from service may have on the provider network 102 and the users thereof.

In the provider network 102, requests for removal of a host 110 from service are received and handled by the isolation manager 120. In response to receipt of a request to remove one or more hosts 110 from service, the isolation manager 120 analyzes the provider network 102 and determines whether the hosts 110 can be removed from service without reducing the computing capacity needed to process the workloads of users assigned to the pools 108 associated with the hosts 110. To determine the effects of removing the hosts 110 from service, the isolation manager 120 retrieves information related to the hosts 110 and the pools 108 in which the hosts 110 reside. Based on the host and pool information, the isolation manager 120 determines whether the hosts 110 are needed to provide adequate computing capacity to users for a foreseeable future time period. If all of the hosts 110 are needed to provide adequate computing capacity to users for the foreseeable future time period, then a request to remove the hosts 110 from service may be completely denied. If only some of the hosts 110 are needed to provide adequate computing capacity to users for the foreseeable future time period, then the request to remove the hosts 110 from service may be granted in part and denied in part. If none of the hosts 110 are needed to provide adequate computing capacity to users for the foreseeable future time period, then the request to remove the hosts 110 from service may be granted in full.

The isolation manager 120 retrieves information from the host identification service 118, the host information service 116, and the capacity manager 114, and applies the retrieved information to determine whether any hosts 110 requested to be removed from service can be removed from service (i.e., isolated). A request to remove hosts 110 from service (e.g., a request to remove hosts 110 from service received from user 126) may identify hosts 110 in a number of ways. In some embodiments, each of the hosts 110 may be identified by a value the uniquely corresponds to the host 110. For example, a serial number, media access controller number, or other unique identifying value for each host 110 for which removal from service is requested may be included in a request provided to the isolation manager 120. The host identification service 118 includes addressing information for each host 110. The addressing information is labeled host addresses 128 in FIG. 1. The host addresses 128 may include a database or other storage and logic that can map the unique host identification values provided in the removal request to internet protocol (IP) addresses used by the hosts 110. In some embodiments, a request to remove hosts 110 from service may include the IP address of each host 110. In some embodiments, the request to remove hosts 110 from service may not uniquely identify each host 110, but may specify a number of hosts 110 to be removed from service, a type of hosts 110 to be removed from service, identification of pools 108 from which the hosts 110 are to removed, and/or other parameters identifying hosts 110 to be removed from service.

Given information identifying the hosts 110 to be removed from service, the isolation manager 120 determines how the hosts 110 are configured and to which pools 108 the hosts 110 are assigned. The host information service 116 includes host configuration 130, which maintains information regarding how each host is configured. For example, the host configuration 130 may include information specifying for each host 110, how many slots or instances 112 are supported by the host 110, what type of instances are supported by the host 110, which instances 112 of the host 110 are allocated to a user, which instances of the host 110 are reserved for use by a user, etc. The host configuration 130 may also include information specifying which pools 108 each host 110 is part of. A host 110 may include instances 112 of different types, and each different type of instance 112 may be included in a different one of the pools 108. Various attributes may distinguish one instance from another, and the different attributes may dictate membership in different pools 108. Underlying virtual machine type, operating system, and provided addressing are examples of attributes that may indicate that an instance 112 should be assigned to one pool 108 or another where all the instances 112 assigned to a pool generally include the same or similar attributes. For example, a host 110 may include one instance 112 based on a first type of virtual machine that has a specific type or combination of hardware allocated to it (e.g., such as GPU or certain amount of RAM) and another instance 112 based on a second type of virtual machine that is assigned a different combination of hardware (e.g., no GPU, more RAM, more storage, more CPU, etc.) than the first type of virtual machine. The instance 112 based on the first type of virtual machine may be assigned to a first pool 108, and the instance 112 based on the second type of virtual machine may be assigned to a second pool 108. The identified pools 108 may be assigned to various and different availability zones 106. The host configuration 130 may include a database or other storage device that provides storage of and access to the host configuration information described above.

Figure 2A:
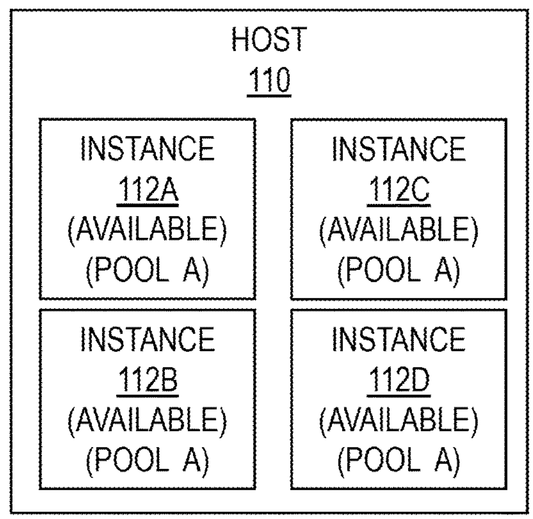
FIGS. 2A, 2B, and 2C show illustrative hosts and various resource instance arrangements that may affect whether a host can be removed from service in accordance with various examples.
Figure 2B:
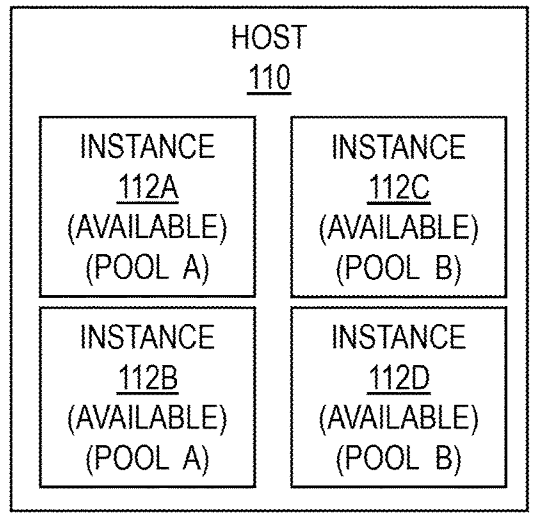
Figure 2C:
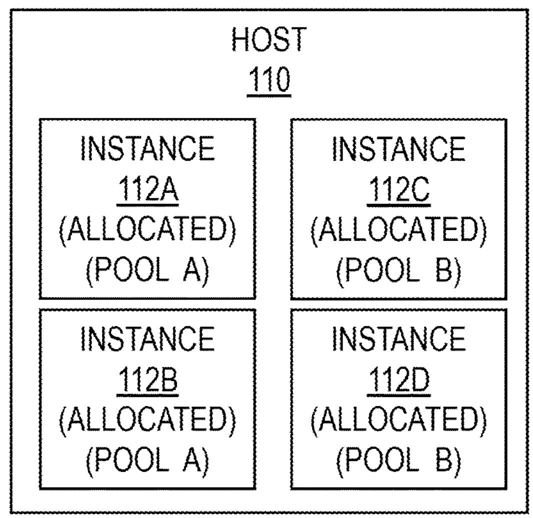

FIGS. 2A, 2B, and 2C show illustrative hosts 110 and various resource instance arrangements that may affect whether a host can be removed from service in accordance with various examples. In FIGS. 2A-2C, the host 110 is configured to support four resource instances 112. That is, the host 110 includes slots that allow the host 110 to provide four resource instances of a particular type for allocation to users, and each of the resource instances 112A, 112B, 112C, and 112D corresponds to distinct underlying computing assets of the host 110. In other embodiments, the host 110 may be configured differently, and provide a different number and/or a different type of resource instances 112. In FIG. 2A, all of the resource instances 112A, 112B, 112C, and 112D is assigned to the same pool 108, and none of the resource instances 112A, 112B, 112C, and 112D is currently assigned to user. Accordingly, the isolation manager 120 may analyze the effect of removing the host 110 from service with respect to a single pool 108. Because none of the instances 112 are allocated to a user, the isolation manager 120 may be able to remove the host 110 from service with no immediate effect on a user. However, the isolation manager 120 may analyze the effects of removing the host 110 from service on expected future utilization of the pool 108 to determine whether the host 110 can be removed from service.

In FIG. 2B, like FIG. 2A, the host 110 is configured to support four resource instances 112, and none of the instances 112 is currently allocated to a user. In FIG. 2B, two of the instances (instances 112A and 112B) are assigned to a first pool 108 (POOL A), and two of the instances (instances 112C and 112D) are assigned to a second pool 108 (POOL B). Because none of the instances 112 are allocated to a user, the isolation manager 120 may be able to remove the host 110 from service with no immediate effect on a user. However, because the instances 112 are assigned to two different pools 108, the isolation manager 120 will analyze the effects of removing the host 110 from service on expected future utilization of the two different pools 108 to determine whether the host 110 can be removed from service. In other embodiments of the host 110, the instances 112 may be assigned to any number of different pools 108, and the isolation manager 120 will analyze the effects of removing the host 110 from service on each of the pools 108 to determine whether a request to remove the host 110 from service can be granted.

In FIG. 2C, like in FIG. 2B, the instances 112A and 112B are assigned to a first pool 108 (POOL A), and instances 112C and 112D are assigned to a second pool 108 (POOL B). Unlike in FIG. 2B, in FIG. C all of the instances 112 are allocated to a user. Because the instances 112 are allocated, the isolation manager 120 may determine that removing the host 110 from service would disrupt those customers and deny a request to remove the host 110 from service. Alternatively, the isolation manager 120 may migrate the instances 112 to a different host 110, if the different host 110 is available, and removal of the host 110 from service would not negatively affect future use of the pool 108. In any case, because the instances 112 are assigned to different pools 108, the isolation manager 120 will analyze the effects of removing the host 110 from service on each of the pools 108 to determine whether a request to remove the host 110 from service can be granted.

Returning now to FIG. 1, the capacity manager 114 includes network capacity information 132 that maintains computing capacity data for each of the pools 108. The isolation manager 120 interacts with the capacity manager 114 to obtain computing capacity information for each of the pools 108 associated with a host 110 to be removed from service. The capacity data may specify, for each pool 108: how many instances 112 in a pool 108 are allocated, how many instances 112 are unallocated and available for allocation, and how many instances are reserved for use by users. The capacity data may also specify, for each pool 108, a desired minimum computing capacity. The capacity manager 114 may include a database or other storage device that stores and provides access to the network capacity information 132.

In some embodiments, the network capacity information 132 may also include data regarding past utilization of computing resources of a pool 108, and information regarding expected future utilization of a pool 108. Measurements of past utilization of a pool 108 may include mean, median, peak, and/or percentile utilization values for a pool 108 over a given time period and at a given sampling interval. For example, mean, median, peak, and/or percentile utilization of the instances 112 of a pool 108 may be recorded for the days, weeks, months, or years preceding receipt of a request to remove hosts 110 from service. Information regarding expected future utilization of computing capacity of the pool 108 may include expected increased demand for computing capacity of the pool based on a projected increase in the number of users of the pool 108, and a projected increase in computing capacity needed by current users of the pool 108. Expected future utilization may be determined based on observed trends in the allocation of instances 112 over time due to the addition of new users, observed trends in the allocation of instances 112 over time due an increased need in computing capacity by current users, and/or information provided by current users regarding an expected increased need for computing capacity.

The isolation manager 120 analyzes the information provided by the capacity manager 114 for each pool 108 containing a host 110 requested to be removed from service to determine whether removing the hosts 110 from service will reduce the computing capacity of the pool 108 to a degree that detrimentally effects execution of users' operations. Based on the information provided by the capacity manager 114, the isolation manager 120 determines a projected supply of instances 112 in the pool 108 and a projected demand for instances in the pool 108 over a predetermined time period. For example, the isolation manager 120 may determine a projected supply of instances 112 in the pool 108 and a projected demand for instances in the pool 108 over a week, or other time period, from a current time. If the projected demand would exceed the projected supply during the predetermined time period if the request to remove hosts 110 from service were granted, then the request may be denied. Alternatively, if projected demand would not exceed the projected supply if some or all of the hosts 110 were removed from service, then the request may be granted in part or in full.

The isolation manager 120 may determine the supply of instances 112 available in the pool 108 as a sum of the number of instances 112 that are unallocated and available for allocation and the number of instances 112 that are expected to be added to the pool by addition of new or repaired hosts 110, less a number of hosts 110 expected to be retired from service in the pool 108 over the predetermined time period and the number of hosts 110 requested to be removed from service by a request. The isolation manager 120 may determine the demand for instances 112 of the pool 108 as a sum of the number of instances allocated to or reserved for users, and a number of instances needed to satisfy predicted growth in demand. In some embodiments, the isolation manager 120 may determine the demand for instances 112 of the pool 108 as a sum of the number of instances allocated to or reserved for users, a number of instances needed to satisfy predicted growth in demand, and a minimum number of instances 112 to be available for allocation to users. In some embodiments, the isolation manager 120 may determine the demand for instances 112 of the pool 108 as peak historical usage of instances 112 over a time period corresponding to the time period over which the effects of removing the hosts 110 from service is considered (e.g., a next week from the present). In some embodiments, the isolation manager 120 may determine the demand for instances 112 of the pool 108 as a maximum value of demand determined by any of the methods referred to above.

The computing capacity supply versus demand analysis performed by the isolation manager 120 may determine that all of the requested hosts 112 may be removed from service, that some of the requested hosts 112 may be removed from service, or that none of the requested hosts 112 may be removed from service. If the request to remove hosts 110 from service does not identify specific hosts 110 to be removed from service, then the isolation manager 120 can select hosts 110 to be removed from service. For example, the isolation manager 120 may select the oldest or most used hosts 110 that are not allocated to a user or reserved for a user to be removed from service. If the request identifies specific hosts 110 to be removed from service, then the isolation manager 120 may prepare the selected hosts 110 for isolation by migrating any workload processed by the hosts 110 to different hosts 110 that are not to be removed from service. In some embodiments, the isolation manager 120 may remove the hosts 110 from service or cause the hosts 110 to be removed from service. For example, the isolation manager 120 may transmit a message to the host information service 116 that causes the host information service 116 to identify the hosts 110 as not part of any pool 108. The isolation manager 120 may transmit a response to the request to the user 126. The response may indicate whether the request to remove hosts 110 from service is granted in full, granted in part, or denied, and indicate for how many and/or for which hosts 110 the request is granted or denied.

Figure 3:
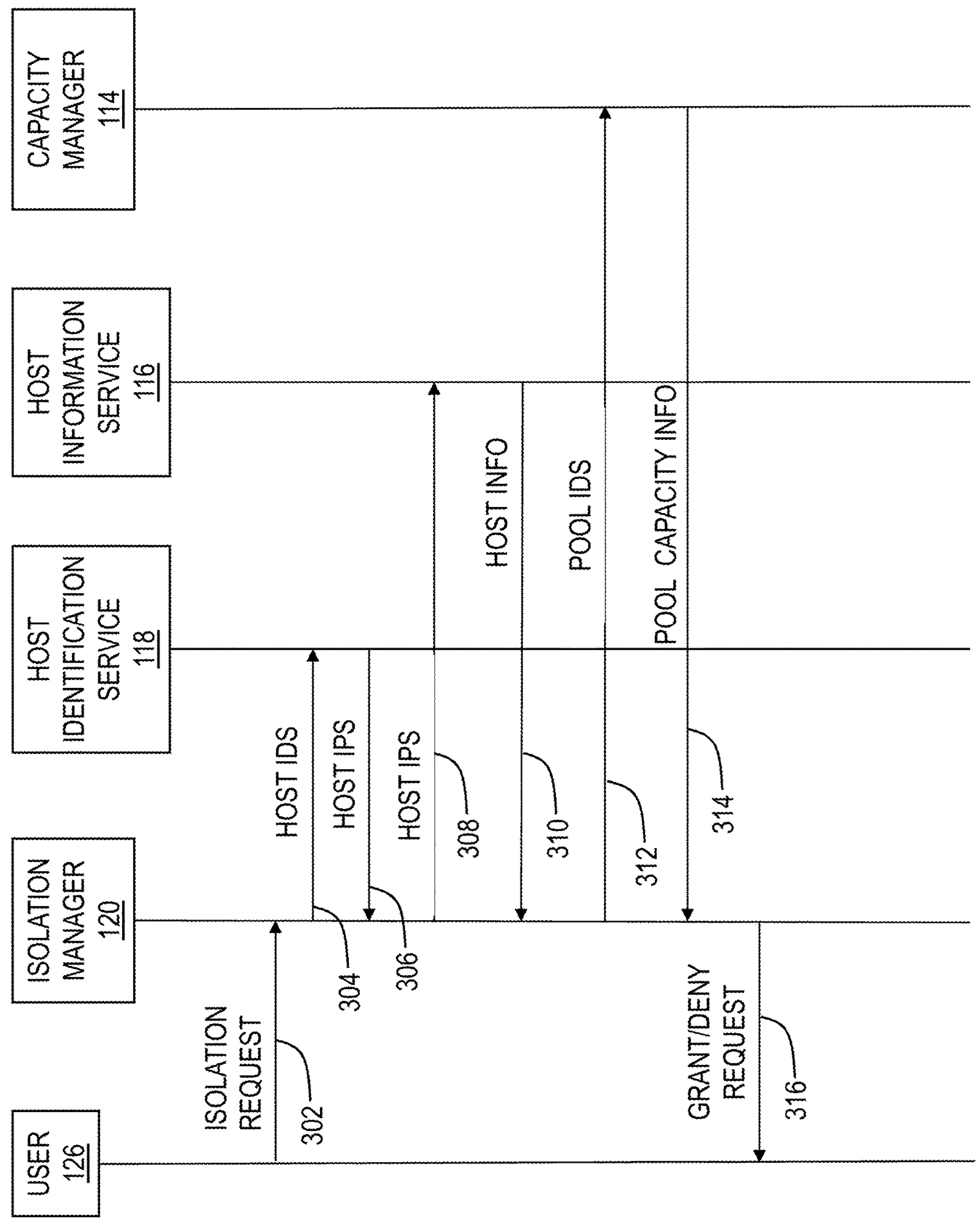
FIG. 3 shows illustrative communication performed to determine whether one or more hosts of a web-based computing system can be removed from service in accordance with various examples.

FIG. 3 shows illustrative communication performed in the system 100 to determine whether one or more hosts 110 of the provider network 102 can be removed from service in accordance with various embodiments. Some embodiments may include more communication, less communication, or different communication than is shown in FIG. 3. The isolation manager 120 receives a request 302 to remove one or more hosts 110 from service. The request 302 may originate at the user 126, such as an administrator of a service provider. Responsive to receipt of the request 302, the isolation manager 120 may extract, from the request 302, information identifying the hosts 110 requested to be removed from service, and validate the information as identifying hosts 110 of the provider network 102. The isolation manager 120 provides the host identification information 304 to the host identification service 118. The host identification information 304 may include an identification value, such as a serial number, that uniquely identifies each host 110. The host identification service 118 receives the host identification information 304. In some embodiments, the host identification service 118 applies the host identification information 304 to access the host addresses 128. The host addresses 128 may include IP addresses assigned to each host 110. The host identification service 118 may return the IP addresses assigned to each of the hosts 110 identified in the host identification information 304 to the isolation manager 120. In some embodiments, the information identifying the hosts 110 extracted from the request 302 may include IP addresses of the hosts 110, and the isolation manager 120 may validate the IP addresses by communication with the host identification service 118.

The isolation manager 120 provides host identification information, such as the host IP addresses 308 to the host information service 116. The host information service 116 includes host configuration 130, which maintains information regarding how each host 110 is configured. For example, the host configuration 130 may include information specifying for each host 110, how many instances 112 are supported by the host 110, what type of instances are supported by the host 110, which instances 112 of the host 110 are allocated to users, which instances of the host 110 are reserved for use by users, etc. The host configuration 130 may also include information specifying the pools 108 to which each host 110 is assigned. The host information service 116 accesses the host configuration 130 to determine the configuration of each of the hosts 110 represented in the identifiers or IP addresses 308, and returns host configuration information 310 specifying the configuration of each of the hosts 110 to the isolation manager 120.

The isolation manager 120 passes pool identification information 312, derived from the host information 310, to the capacity manager 114. The capacity manager 112 includes network capacity information 132 that maintains computing capacity data for each of the pools 108. The capacity manager 114 provides, to the isolation manager 120, computing capacity information 314 for each of the pools 108 associated with a host 110 to be removed from service. The computing capacity information 314 may include past and present utilization measurements for each pool 108. The capacity data may also specify, for each pool 108, a desired minimum computing capacity. The computing capacity information 314 may also include information regarding expected future utilization of pool 108.

The isolation manager 120 analyzes the capacity information 314 provided by the capacity manager 114 for each pool 108 containing a host 110 requested to be removed from service to determine whether removing the hosts 110 from service will reduce the computing capacity of the pool 108 to a degree that detrimentally effects the capacity of the pool (e.g., less than X % of the estimated amount of capacity needed to satisfy requests for instances in the pool, where X is set by an administrator based on how much confidence the service provider has that the forecast is accurate, the desire to ensure that a pool will have insufficient capacity, etc.). Based on the analysis, the isolation manager 120 determines which requested hosts 110 can be removed from service, and transmits a response 316 to the user 126. The response 316 identifies the hosts 110 for which the request is granted and identifies the hosts 110 for which the request is denied.

Figure 4:
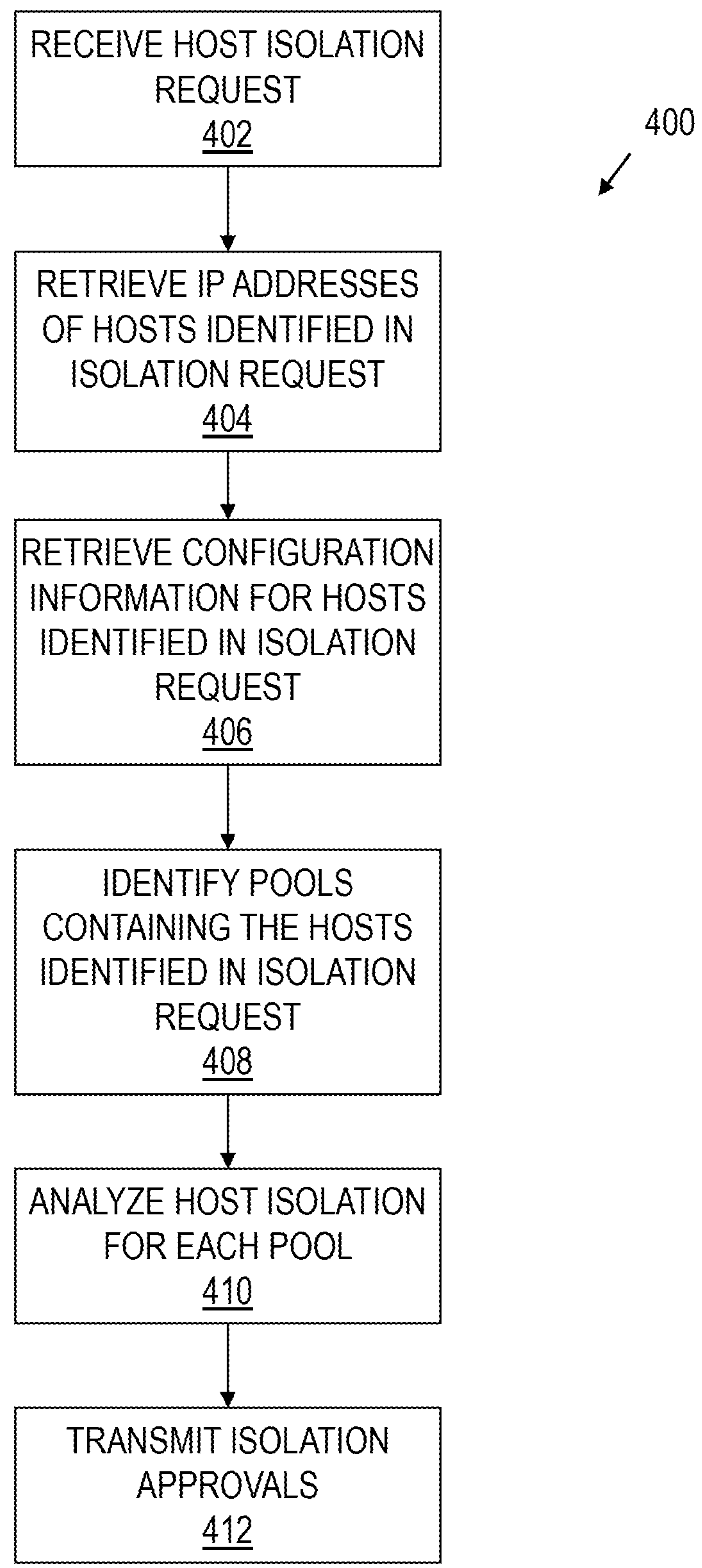
FIG. 4 shows a flow diagram for a method for removing a host from service in a web-based computing system in accordance with various examples.

FIG. 4 shows a flow diagram for a method 400 for removing a host from service in a web-based computing system in accordance with various examples. Though depicted sequentially as a matter of convenience, at least some of the actions shown can be performed in a different order and/or performed in parallel. Additionally, some embodiments may perform only some of the actions shown. In some embodiments, at least some of the operations of the method 400 may be provided by instructions executed by a computer of the provider network 102.

In block 402, the isolation manager 120 receives a request (an isolation request) to remove one or more hosts 110 from service in the provider network 102. The isolation request may originate at the user 126 or other device communicatively coupled to the isolation manager 120 via the internet 124 or other communication network or connection. The isolation request may identify specific hosts 110 requested to be removed from service, designate a number and/or type of host 110 to be removed from service, or otherwise specify hosts to be removed from service in the provider network 102. For example, a serial number, media access controller number, or other unique identifying value for each host 110 for which removal from service is requested may be included in the isolation request. The isolation manager 120 may validate the isolation request to ensure that the hosts 110 identified in the request are elements of the provider network 102.

In block 404, the isolation manager 120 may retrieve an IP address for each host 110 identified in the isolation request. The isolation manager 120 may extract, from the isolation request, information identifying the hosts 110 requested to be removed from service. The isolation manager 120 may provide the host identification information to the host identification service 118. The host identification information may include an identification value, such as a serial number, that uniquely identifies each host 110. The host identification service 118 receives the host identification information and applies the host identification information to access the host addresses 128. The host addresses 128 may include IP addresses assigned to each host 110 of the provider network 102. The host identification service 118 returns the IP addresses assigned to each of the hosts 110 identified in the host identification information to the isolation manager 120. In some embodiments, the information identifying the hosts 110 extracted from the request 302 may include IP addresses of the hosts 110, and the isolation manager 120 may validate the IP address by communication with the host identification service 118.

In block 406, the isolation manager retrieves configuration for the hosts 110 identified in the isolation request. The isolation manager 120 may communicate with the host information service 116 to obtain the configuration information for the hosts 110. For example, the isolation manager 120 may provide the host information service 116 with information identifying each host 110 requested to be removed from service. The host information service 116 may access the host configuration 130 and retrieve configuration information for the hosts 110. The configuration information may specify how each host 110 is structured and utilized. Further details regarding retrieval of configuration information for the hosts 110 requested to be removed from service are provided in FIG. 5 and associated text.

In block 408, the isolation manager 120 identifies the pools 108 to which the hosts 110 identified in the isolation request are assigned. The instances 112 supported by each of the hosts 110 may be assigned to one or more pools 108. All of the instances 112 provided by some hosts 110 may be assigned to a single pool 108, while in other hosts 110, the instances 112 may be assigned to two or more pools 108. The isolation manager 120 may determine the number of pools 108 to which instances 112 of each host 110 are assigned via host configuration information provided by the host information service 116. The host configuration information may specify the pools 108 to which each of the instances 112 provided by each host 110 are assigned.

In block 410, the isolation manager 120 analyzes each pool 108 to which one of the hosts 110 is assigned to determine whether removal of the hosts 110 from service may negatively impact users of the provider network 102. Analysis of the effects of removing the requested hosts 110 from service may include determination of the supply of instances 112 expected to be available to users and the expected demand for instances by users. Further details regarding analysis of the potential effects of removing the hosts 110 from service are provided in FIG. 6 and associated text.

In block 412, the isolation manager 120 has determined whether the hosts 110 can be removed from service in the system 102 without negatively affecting the utilization of the provider network 102 by users. The isolation manager 120 transmits information to the user 126 indicating which of the hosts 110 are approved for removal from service, and indicating which of the hosts 110 are not approved for removal from service. In some embodiments, the isolation manager 120 may remove from service, or cause to be removed from service, the hosts 110 that are indicated to be approved for removal from service.

Figure 5:
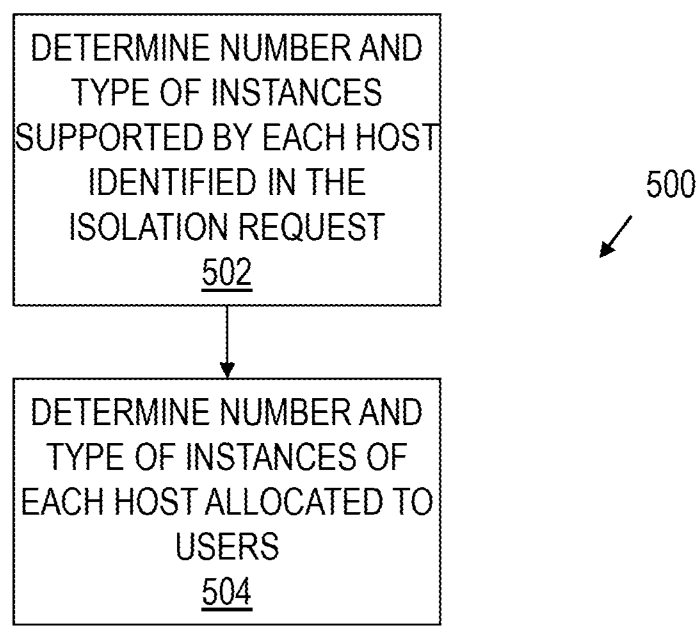
FIG. 5 shows a flow diagram for a method for providing configuration information for a host that may be removed from service in a web-based computing system in accordance with various examples.

FIG. 5 shows a flow diagram for a method for providing configuration information for a host that may be removed from service in a web-based computing system in accordance with various examples. Though depicted sequentially as a matter of convenience, at least some of the actions shown can be performed in a different order and/or performed in parallel. Additionally, some embodiments may perform only some of the actions shown. In some embodiments, at least some of the operations of the method 500 may be provided by instructions executed by a computer of the provider network 102. The operations of the method 500 may be performed as part of block 406 of the method 400.

In block 502, the isolation manager 120 determines the number of instances 112 supported by each host 110 identified in the isolation request for removal from service. Different hosts 110 may support a different number of instances 112. The isolation manager 120 may determine the number of instances 112 supported by each host 110 via communication with the host information service 116. For example, the isolation manager 120 may provide the host information service 116 with information identifying each host 110 requested to be removed from service. The host information service 116 may access the host configuration 130 and retrieve configuration information for the hosts 110. The configuration information may specify how many instances 112 are supported by each host 110 (e.g., how many slots are provided by each host 110). The host information service 116 may provide the configuration information specifying the number of instances supported by each host 110 to the isolation manager 120.

In block 504, the isolation manager 120 determines the number of instances 112 supported by each host 110 that are currently allocated to or reserved for use by a user of the provider network 102. In some hosts 110, none of the instances 112 provided by the host 110 may be allocated or reserved, while in other hosts 110, some or all of the instances 112 may be allocated or reserved. The isolation manager 120 may determine the number of instances 112 currently allocated to or reserved for use by a user via communication with the host information service 116. For example, the isolation manager 120 may provide the host information service 116 with information identifying each host 110 requested to be removed from service. The host information service 116 may access the host configuration 130 and retrieve configuration information for the hosts 110. The configuration information may specify how many instances 112 provided by each host 110 are currently allocated to or reserved for use by a user. The host information service 116 may provide the configuration information specifying the number of instances of each host 110 that are currently allocated or reserved for use by a user to the isolation manager 120.

Figure 6:
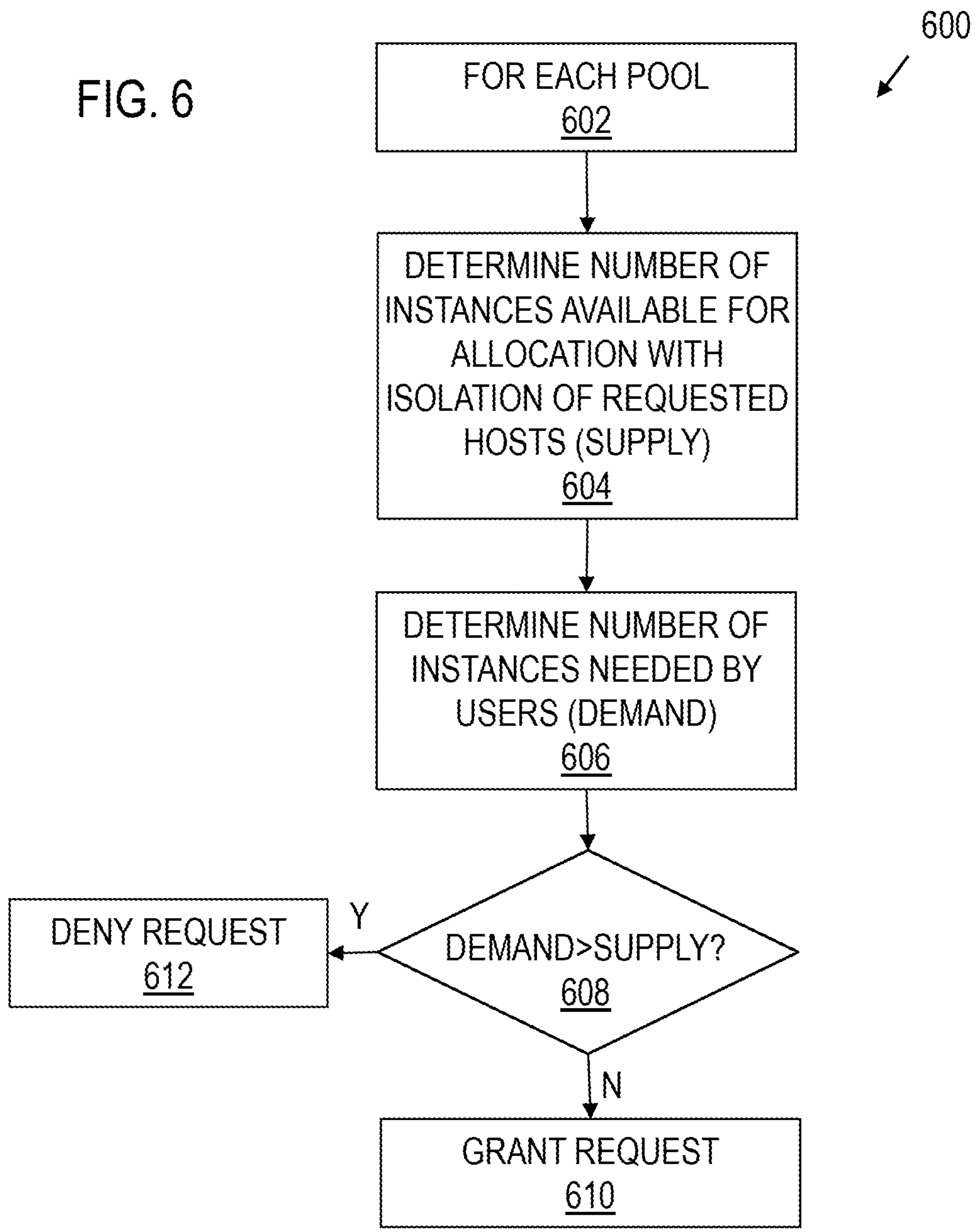
FIG. 6 shows a flow diagram for a method for analyzing whether hosts can be removed from the pools in which the hosts operate without negatively affecting user operations in accordance with various examples.

FIG. 6 shows a flow diagram for a method for analyzing whether hosts can be removed from the pools in which the hosts operate without negatively affecting system capacity in accordance with various examples. Though depicted sequentially as a matter of convenience, at least some of the actions shown can be performed in a different order and/or performed in parallel. Additionally, some embodiments may perform only some of the actions shown. In some embodiments, at least some of the operations of the method 600 may be provided by instructions executed by a computer of the provider network 102. The operations of the method 600 may be performed as part of block 410 of the method 400.

Block 602 indicates that the subsequent operations are performed for each pool 108 that includes a host 110 that has been requested to be removed from service. As explained above, an isolation request may specify any number of hosts 110 that may be assigned to any number of pools 108. Some or all of the instances 112 provided by a host 110 may be assigned to different pools 108, or all the instances 112 provided by a host 110 may be assigned to the same pool 108. Accordingly, any number of pools 108 may need to be evaluated responsive to a request to remove one or more hosts 110 from service.

In block 604, for a pool 108, the isolation manager 120 determines the amount of computing resources that will be available for allocation to users if the hosts 110 identified in an isolation requested are removed from service. That is, the isolation manager 120 makes a measurement of the supply of computing resources available in the pool 108 for allocation to users if the hosts 110 identified in an isolation requested are removed from service. The amount of computing resources may be measured as a number of instances 112 available for allocation. Additional information regarding determining the supply of computing resources that will be available for allocation is provided in FIG. 7 and associated text.

In block 606, for a pool 108, the isolation manager 120 determines the amount of computing resources that will be needed for allocation to users over some time period (e.g., the next week, next month, etc.). That is, the isolation manager 120 makes a measurement of the demand for computing resources in the pool 108 over the time period. The amount of computing resources may be measured as a number of instances 112 expected to needed for allocation. Additional information regarding determining the supply of computing resources that will be available for allocation is provided in FIG. 8 as associated text.

In block 608, if the expected demand exceeds the expected supply, then the isolation manager 120 may deny the isolation request in block 612. If the expected demand does not exceed the expected supply, then the isolation manager 120 may grant the isolation request in block 612. In some embodiments, the isolation manager 120 may grant the isolation request in part, and deny the isolation request in part. For example, if expected demand does not exceed expected supply in a first pool 108, and removal of the hosts 110 of the first pool 108 from service does not cause demand to exceed supply in a second pool, then the isolation manager 120 may grant the isolation request with respect to the hosts 110 of the first pool, but deny the isolation request with respect to a different pool 108 in which demand exceeds supply if the hosts 110 of the different pool 108 are removed from service.

The isolation manager 120 may communicate with the user 126 to identify the hosts 110 for which the isolation request is granted and identify the hosts 110 for which the isolation request is denied.

Figure 7:
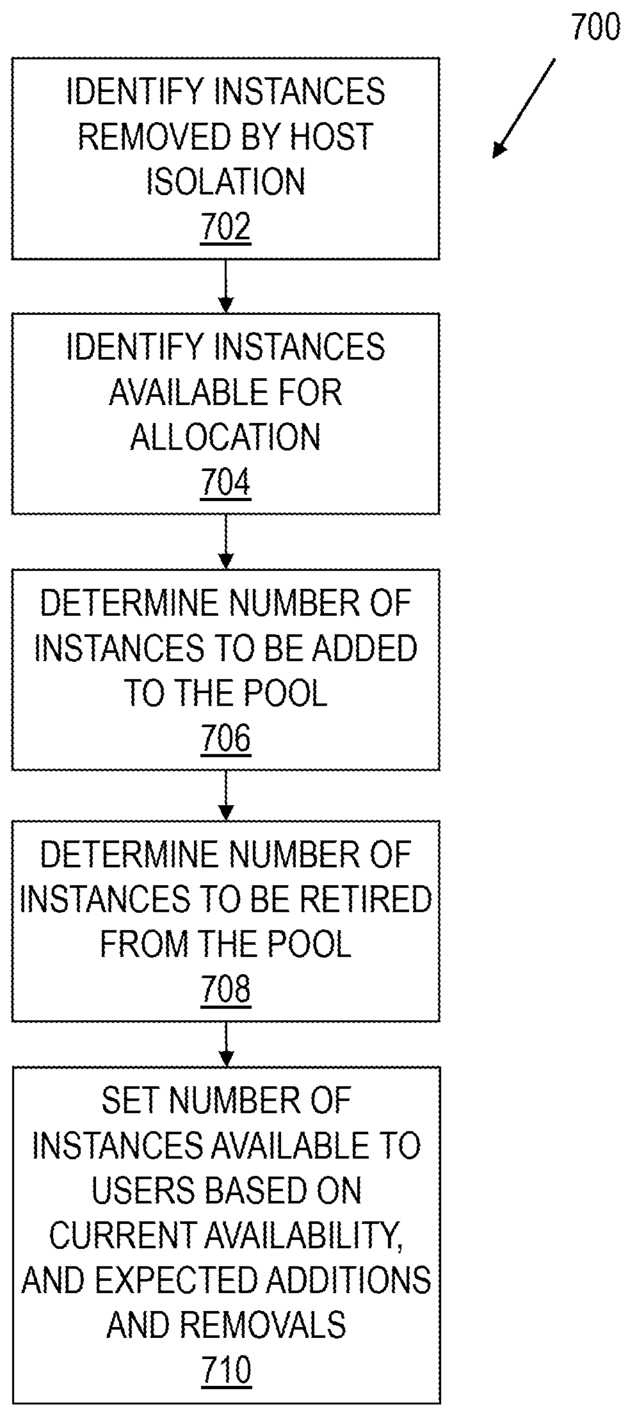
FIG. 7 shows a flow diagram for a method for determining a number of hosts available to support user operations in web-based computing system in accordance with various examples.

FIG. 7 shows a flow diagram for a method for determining a number of instances available to support user applications in web-based computing system in accordance with various examples. Though depicted sequentially as a matter of convenience, at least some of the actions shown can be performed in a different order and/or performed in parallel. Additionally, some embodiments may perform only some of the actions shown. In some embodiments, at least some of the operations of the method 700 may be provided by instructions executed by a computer of the provider network 102. The operations of the method 700 may be performed as part of block 604 of the method 600, and accordingly are performed on a per pool basis.

In block 702, the isolation manager 120 identifies the instances 112 to be removed from service if a host 110 is removed from service. That is, the isolation manager 120 identifies the instances 112 that are provided by a host 110 identified in an isolation request that are part of a pool 108 under consideration.

In block 704, the isolation manager 120 determines the number of instances 112 of the pool 108 that are available for allocation. The number of instances 112 available for allocation to a user may include the number of instances 112 or slots that are not currently allocated to a user or reserved for allocation to a user. In some embodiments, the number of instances 112 of the pool 108 that are available for allocation to a user may be derived from information provided by the capacity manager 114 for the pool 108.

In block 706, the isolation manager 120 determines a number of instances 112 to be added to the pool 108 over a time period. For example, instances 112 may be added to the pool 108 as new hosts 110 are added to the provider network 102 or as hosts 110 previously removed from service, for repair or other reasons, are returned to the provider network 102. In some embodiments, information regarding scheduling of the addition of instances 112 to the pool 108 may be provided by the capacity manager 114.

In block 708, the isolation manager 120 determines a number of instances 112 to be retired (i.e., removed from service) in the pool 108 over a time period. For example, instances 112 may be scheduled for retirement to make room for newer hosts 110 or to remove outdated instances 112 from the provider network 102. In some embodiments, information regarding scheduling of the retirement of instances 112 from the pool 108 may be provided by the capacity manager 114.

In block 710, the isolation manager 120 may determine the supply of instances 112 available for allocation to users at a given time to be the sum of instances 112 identified in blocks 704 and 706 less the instances identified in blocks 702 and 708. In some embodiments, the isolation manager 120 may adjust the supply downward to accommodate a minimum number of instances 112 that should remain available for allocation in a pool 108 (e.g., a headroom value).

Figure 8:
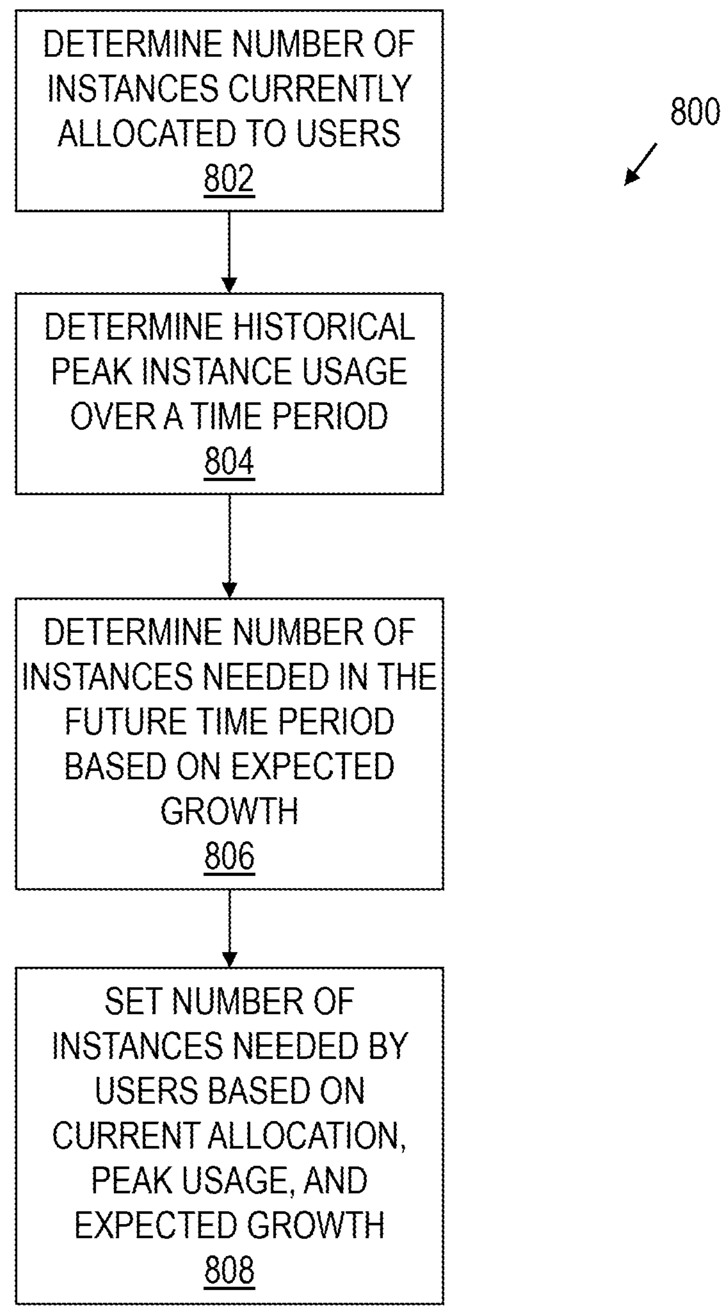
FIG. 8 shows a flow diagram for a method for determining a number of hosts that are needed to support user operations in a web-based computing system in accordance with various examples.

FIG. 8 shows a flow diagram for a method for determining a number of instances that are needed to support user applications in a web-based computing system in accordance with various examples. Though depicted sequentially as a matter of convenience, at least some of the actions shown can be performed in a different order and/or performed in parallel. Additionally, some embodiments may perform only some of the actions shown. In some embodiments, at least some of the operations of the method 800 may be provided by instructions executed by a computer of the provider network 102. The operations of the method 800 may be performed as part of block 606 of the method 600, and accordingly are performed on a per pool basis.

In block 802, the isolation manager 120 determines how many instances 112 of a pool are currently allocated to users. The number of instances 112 allocated to users may include the number of instances 112 in use by a user and the number of instances 112 reserved for use by a user. In some embodiments, information regarding how many instances of a pool are allocated to a user or reserved for a user may be provided by the capacity manager 114.

In block 804, the isolation manager 120 determines a value of peak usage of instances 112 in the pool 108. The value of peak usage may be derived from usage measurements over a selected historical time period. In some embodiments, a past time period that may exhibit instance usage patterns similar to those expected during an upcoming time period may be considered, and the peak instance usage during the past time period determined. For example, if the time period over which supply and demand are being considered includes a week or month in which a holiday falls, or other period in which high usage may be anticipated, then the isolation manager 120 may consider past usage in a similar holiday period to identify peak usage. In some embodiments, information regarding past utilization of the pool 108 may be provided by the capacity manager 114.

In block 806, the isolation manager 120 determines the number of instances 112 that may be needed by users based on expected growth in demand for instances 112. Expected growth may be based on a past rate of increased demand for instances 112 in the pool 108. For example, a rate which new users of the provider network 102 were added in the past and the number of instances 112 needed by the new users may be one component of expected growth. Information provided by current users regarding an expected increase in demand for instances 112 may also be considered in determining the expected growth. For example, if the past demand for instances 112 has increased a rate of 2% per month and users of the pool 108 have indicated that their short time needs may increase by 10% over the next month, then expected growth may indicate that demand or instances 112 of the pool 108 may increase by 12% over the next month. In some embodiments, information regarding expected future utilization of the pool 108 may be provided by the capacity manager 114.

In block 806, the isolation manager 120 determines a value of expected demand based on the values determined in blocks 802-806. The isolation manager 120 may apply the values determined in blocks 802-806 in various ways to arrive at a value for demand. For example, the isolation manager 102 may determine the demand to be a greater of current usage from block 802 and peak usage from block 804 increased to accommodate the expected growth of block 806. Alternatively, the isolation manager 102 may determine the demand to be the current usage of block 802 increased by a difference of peak and average or median usage in block 804 and further increased to accommodate the expected growth of block 806.

Figure 9:
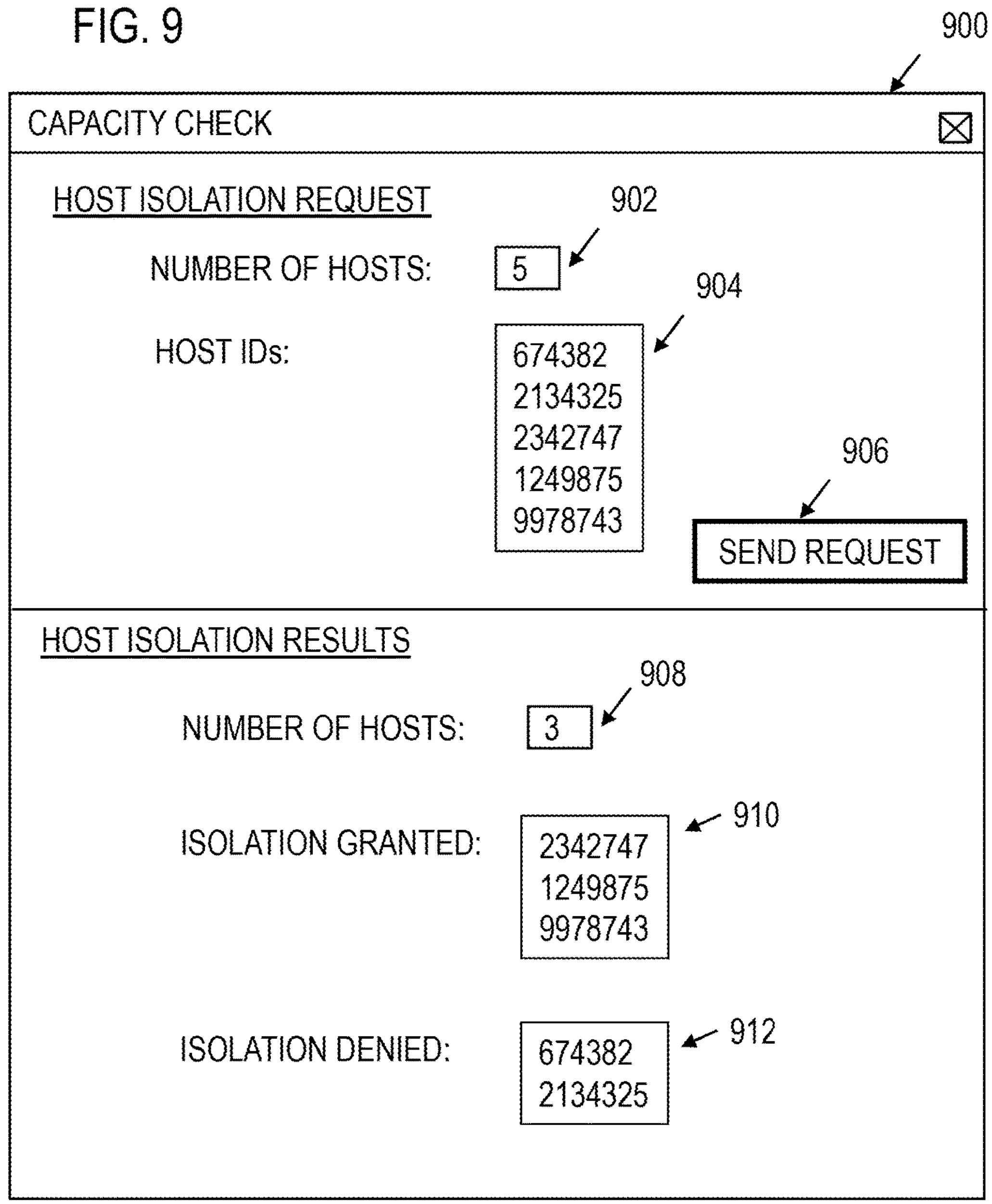
FIG. 9 shows an illustrative dialog for requesting that hosts be removed from service and receiving results of the request in a web-based computing system in accordance with various examples.

FIG. 9 shows an illustrative dialog 900 for requesting that hosts be removed from service and receiving results of the request in a web-based computing system in accordance with various examples. The dialog 900 allows a user to enter a number of hosts 110 and/or specific hosts 110 that the user would like to request be removed from service in the provider network 102. The dialog 900 may be rendered as a web page displayed by the user 126. The dialog 900 transfers information specifying how many and/or which hosts 110 are requested to be removed from service in the provider network 102 to the isolation manager 120 via the interface manager 122. Results of the request are generated by the isolation manager 120 and returned to the dialog 900 via the interface manager 122.

In the dialog 900, field 902 provides for entry of a number of hosts 110 to be requested removed from service in the provider network 102. Field 904 provides for user entry of host identification values that identify specific hosts 110 requested to be removed from service in the provider network 102. For example, each host 110 may be assigned a different identification value that can used to distinguish one host 110 from another. For example, a serial number, media access controller address, internet protocol address, or other value that uniquely identifies a host 110 in the provider network 102 may be used as an identification value for the host 110. Various embodiments of the dialog 900 may allow any number of different host identification values to be entered. Some embodiments may include fields that allow for entry of additional and/or different information to specify which hosts 110 are requested to be removed from service in the provider network 102. For example, an embodiment of the dialog 900 may provide for entry of the information that specifies a type of host to be removed from service, or may provide for entry of identification of one or more pools from which hosts are to be removed from service.

The dialog 900 includes a send request button 906 that can be selected to transfer the host 110 information entered in fields 902 and 904 to the isolation manager 120. After a user has entered information into the dialog 900 specifying the hosts 110 to be removed from service in the provider network 102, the user may select the send request button 906 to cause the dialog 900 to transfer the host information to the isolation manager 120 via the interface manager 122.

After the isolation manager 120 has processed a request to remove hosts 110 from service in the provider network 102, the isolation manager 120 transmits a response to the request to the dialog 900. The response may identify those hosts 110 for which the request to be removed from service is granted, and may identify those hosts 110 for which the request to be removed from service is denied. In the dialog 900, the field 908 displays an indication of the number of hosts 110 requested to be removed from service for which the request has been granted. The field 910 identifies the specific hosts 110 requested to be removed from service for which the request has been granted. The field 912 identifies the specific hosts 110 requested to be removed from service for which the request has been rejected.

Figure 10:
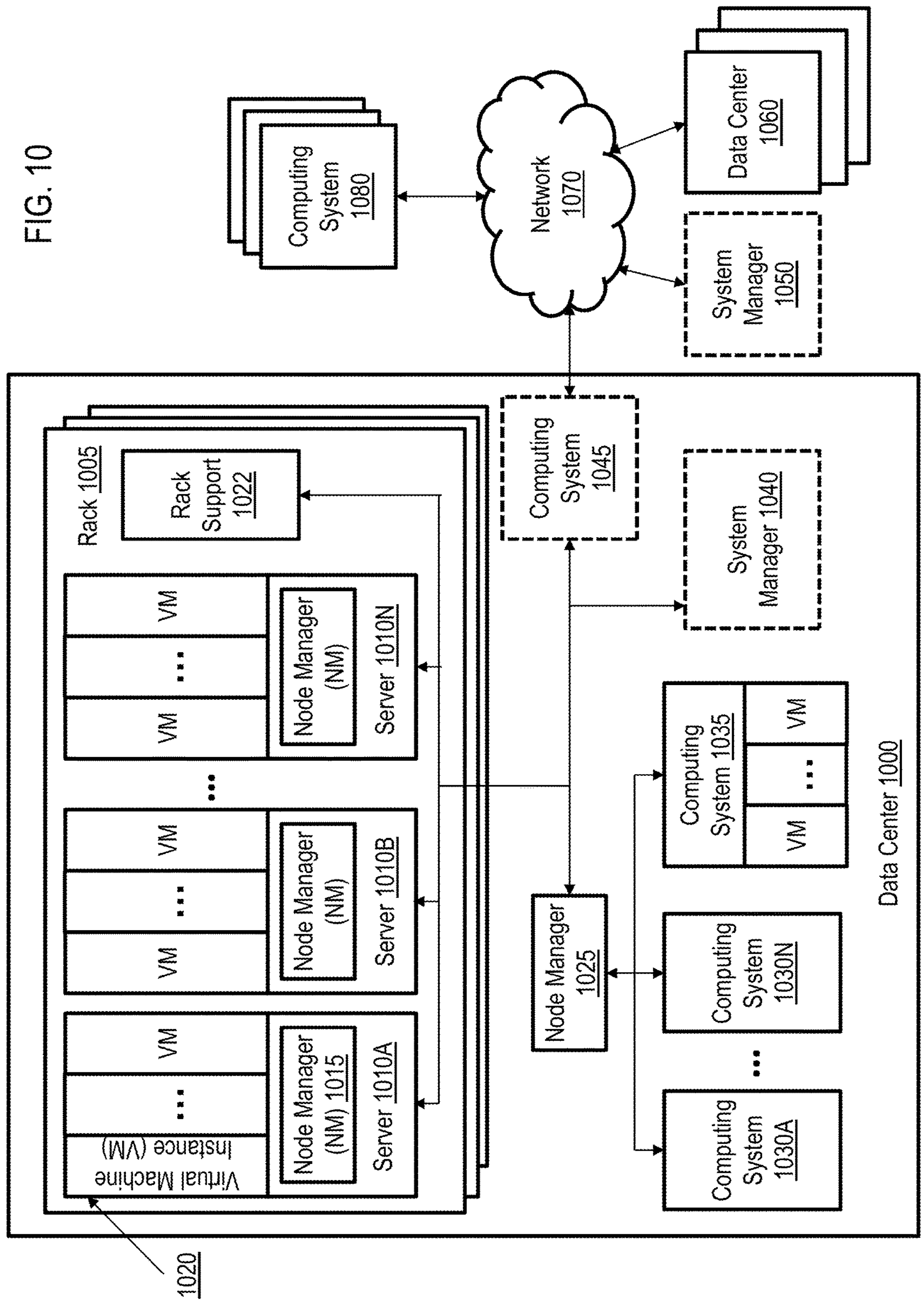
FIG. 10 shows a block diagram for a computing environment in which various embodiments of a web-based computing system with host isolation management may be implemented.

FIG. 10 shows a block diagram for a computing environment in which various embodiments of a web-based computing system with host isolation management may be implemented. In particular, in this example a program execution service manages the execution of programs on various computing systems located within a data center 1000. Data center 1000 includes a number of racks 1005, and each rack includes a number of computing systems 1010A-N, as well as a rack support computing system 1022 in this example embodiment. The computing systems 1010 each host one or more virtual machine instances 1020 in this example, as well as a distinct node manager 1015 to manage the virtual machines. In this example, each virtual machine 1020 may be employed to provide an independent computing environment for executing an instance of program. In this example, the rack support computing system 1022 may provide various utility services for other computing systems local to the rack, as well as possibly to other computing systems located in the data center 1000. The utility services may include, for example, data and/or program storage for other computing systems, execution of one or more machine manager modules to support other computing systems, etc. Each computing system 1010 may alternatively have a distinct machine manager module (e.g., provided as part of the node manager for the computing system) and/or have local storage (not shown) to store local copies of programs. The computing systems 1010 and the rack support computing system 1022 all share a common data exchange medium in this example, and may all be part of a single group. This common data exchange medium may be connected to one or more external data exchange mediums shared by, for example, other racks or computing systems in the data center 1000.

In addition, the example data center 1000 further includes additional computing systems 1030A-N and 1035 that share a common data exchange medium with a node manager 1025, and node manager 1025 manages computing systems 1030 and 1035. In the illustrated example, computing system 1035 also hosts a number of virtual machines as execution environments for use in executing program instances for one or more users, while computing systems 1030 do not host distinct virtual machines. In this example, an optional computing system 1045 resides at the interconnect between the data center 1000 and an external network 1070. The optional computing system 1045 may provide a number of services such as acting as a network proxy, managing incoming and/or outgoing data transmissions, etc. Additionally, an optional system manager computing system 1040 is also illustrated. The optional system manager computing system 1040 may assist in managing the execution of programs on other computing systems located within the data center 1000 (or optionally on computing systems located in one or more other data centers 1060). The optional system manager computing system 1040 may execute a system manager module. A system manager module may provide a variety of services in addition to managing execution of programs, including the management of user accounts (e.g., creation, deletion, billing, etc.); the registration, storage, and distribution of programs to be executed; the collection and processing of performance and auditing data related to the execution of programs; the obtaining of payment from customers or other users for the execution of programs; etc.

In this example, the data center 1000 is connected to a number of other systems via a network 1070 (e.g., the Internet), including additional computing systems 1080 that may be operated by the operator of the data center 1000 or third parties such as users, additional data centers 1060 that also may be operated by the operator of the data center 1000 or third parties, and an optional system manager 1050. In a manner similar to system manager 1040, the system manager 1050 may manage the execution of programs on computing systems located in one or more data centers 1000 and/or 1060, in addition to providing a variety of other services. Although the example system manager 1050 is depicted as external to any particular data center, in other embodiments it may be located within a data center, such as one of the data centers 1060.

Figure 11:
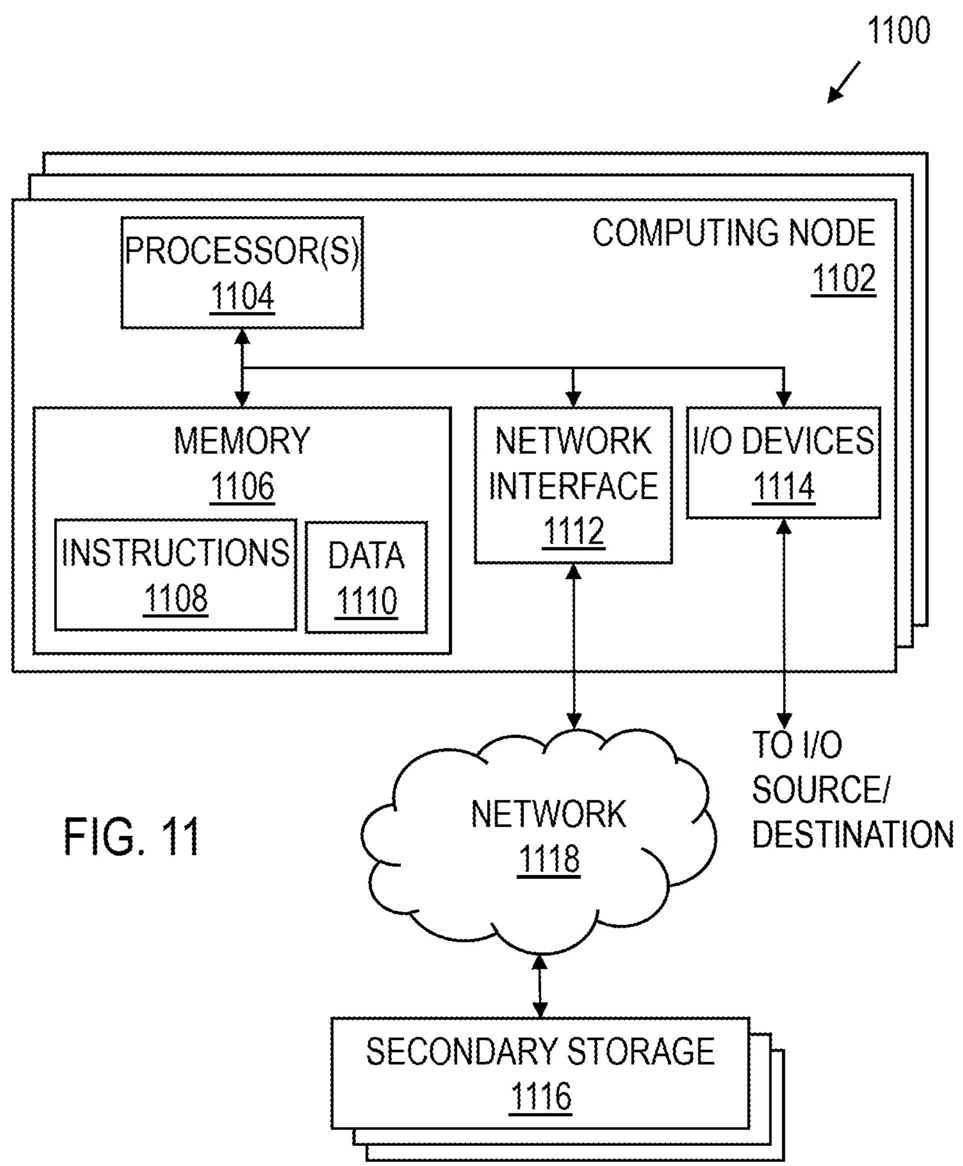
FIG. 11 shows a schematic diagram for computing apparatus that may be applied to implement a web-based computing system that includes host isolation management in accordance with various examples.

FIG. 11 shows a schematic diagram for computing apparatus 1100 that may be applied to implement a web-based computing system that includes host isolation management in accordance with various examples. The computing apparatus 1100 includes one or more computing nodes 1102 and secondary storage 1116 that are communicatively coupled via a network 1118. One or more of the computing nodes 1102 and associated secondary storage 1116 may be applied to provide the functionality of the provider network 102 including the hosts 110, the resource instances 112, the isolation manager 120, the host identification service 118, the host information service 116, the capacity manager 114, and other components of the provider network 102.

Each computing node 1102 includes one or more processors 1104 coupled to memory 1106, network interface 1112, and I/O devices 1114. In some embodiments of the provider network 102, a computing node 1102 may implement the functionality of more than one component of the provider network 102. In various embodiments, a computing node 1102 may be a uniprocessor system including one processor 1104, or a multiprocessor system including several processors 1104 (e.g., two, four, eight, or another suitable number). Processors 1104 may be any suitable processor capable of executing instructions. For example, in various embodiments, processors 1104 may be general-purpose or embedded microprocessors implementing any of a variety of instruction set architectures (ISAs), such as the x86, PowerPC, SPARC, or MIPS ISAs, or any other suitable ISA. In multiprocessor systems, each of processors 1104 may commonly, but not necessarily, implement the same ISA. Similarly, in a distributed computing system such as one that collectively implements the provider network 102, each of the computing nodes 1102 may implement the same ISA, or individual computing nodes and/or replica groups of nodes may implement different ISAs.

The memory 1106 may include a non-transitory, computer-readable storage medium configured to store program instructions 1108 and/or data 1110 accessible by processor(s) 1104. The system memory 1106 may be implemented using any suitable memory technology, such as static random access memory (SRAM), synchronous dynamic RAM (SDRAM), nonvolatile/Flash-type memory, or any other type of memory. Program instructions 1108 and data 1110 implementing the functionality disclosed herein are stored within system memory 1106. For example, instructions 1108 may include instructions that when executed by processor(s) 1104 implement the isolation manager 120, and other systems and components disclosed herein.

Secondary storage 1116 may include volatile or non-volatile storage and storage devices for storing information such as program instructions and/or data as described herein for implementing the provider network 102. The secondary storage 1116 may include various types of computer-readable media accessible by the computing nodes 1102 via the network 1118. A computer-readable medium may include storage media or memory media such as semiconductor storage, magnetic or optical media, e.g., disk or CD/DVD-ROM, or other storage technologies. Program instructions and data stored on the secondary storage 1116 may be transmitted to a computing node 1102 for execution by a processor 1104 by transmission media or signals via the network 1118, which may be a wired or wireless network or a combination thereof.

The network interface 1112 may be configured to allow data to be exchanged between computing nodes 1102 and/or other devices coupled to the network 1118 (such as other computer systems, communication devices, input/output devices, or external storage devices). The network interface 1112 may support communication via wired or wireless data networks, such as any suitable type of Ethernet network, for example; via telecommunications/telephony networks such as analog voice networks or digital fiber communications networks, via storage area networks such as Fiber Channel SANs, or via any other suitable type of network and/or protocol.

Input/output devices 1114 may include one or more display terminals, keyboards, keypads, touchpads, scanning devices, voice or optical recognition devices, or any other devices suitable for entering or retrieving data by one or more computing nodes 1102. Multiple input/output devices 1114 may be present in a computing node 1102 or may be distributed on various computing nodes 1102 of the apparatus 1100. In some embodiments, similar input/output devices may be separate from computing node 1102 and may interact with one or more computing nodes 1102 of the provider network 102 through a wired or wireless connection, such as over network interface 1112.

Those skilled in the art will appreciate that computing apparatus 1100 is merely illustrative and is not intended to limit the scope of embodiments. In particular, the computing apparatus 1100 may include any combination of hardware or software that can perform the functions disclosed herein, including computers, network devices, internet appliances, PDAs, wireless phones, pagers, etc. Computing node 1102 may also be connected to other devices that are not illustrated, in some embodiments. In addition, the functionality provided by the illustrated components may in some embodiments be combined in fewer components or distributed in additional components. Similarly, in some embodiments the functionality of some of the illustrated components may not be provided and/or other additional functionality may be available.

Those skilled in the art will also appreciate that in some embodiments the functionality disclosed herein may be provided in alternative ways, such as being split among more software modules or routines or consolidated into fewer modules or routines. Similarly, in some embodiments illustrated methods may provide more or less functionality than is described, such as when other illustrated methods instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other embodiments the operations may be performed in other orders and in other manners. The various methods as depicted in the figures and described herein represent illustrative embodiments of methods. The methods may be implemented in software, in hardware, or in a combination thereof in various embodiments. Similarly, the order of any method may be changed, and various elements may be added, reordered, combined, omitted, modified, etc., in various embodiments.

Certain terms are used throughout the foregoing description and the following claims to refer to particular system components. As one skilled in the art will appreciate, different companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct wired or wireless connection. Thus, if a first device couples to a second device, that connection may be through a direct connection or through an indirect connection via other devices and connections. The recitation "based on" is intended to mean "based at least in part on." Therefore, if X is based on Y, X may be based on Y and any number of other factors.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A system, comprising:

a plurality of computing devices, each of the computing devices configurable to host a plurality of resource instances of a provider network; and a computing device configured to implement an isolation manager that determines which computing assets to remove from service, the isolation manager configured to:

receive, from a requestor, identification for selected computing assets requested to be removed from service, wherein each of the computing assets is one of the computing devices or a slot of one of the computing devices;

determine a number of resource instances hosted by the computing assets requested to be removed from service;

identify a pool to which each of the computing assets requested to be removed from service is assigned;

for each pool to which one of the computing assets is assigned:

determine a value of supply of resource instances in the pool based on removal from service of the computing assets;

determine a value of demand for resource instances in the pool;

determine whether removal from service of the computing assets requested to be removed from service in the pool causes the value for demand to exceed the value for supply;

approve removal from service of the computing assets based on the value for demand not exceeding the value for supply; and notify the requestor as to which of the computing assets requested to be removed from service is approved for removal from service; and remove from service the computing assets approved for removal from service.

2. The system of claim 1, wherein the isolation manager is configured to:

for each pool to which one of the computing assets is assigned:

determine a number of the resource instances that are currently allocated to users; and set the value of demand based on the number of the resource instances that are currently allocated to users.

3. The system of claim 1, wherein the isolation manager is configured to:

for each pool to which one of the computing assets is assigned:

determine a number of the resource instances that were historically allocated to users;

determine a number of the resource instances needed to satisfy growth in an upcoming time period; and set the value of demand based on the number of the resource instances that were historically allocated to users and the number of the resource instances needed to satisfy growth in the upcoming time period.

4. The system of claim 1, wherein the isolation manager is configured to:

determine a number of resource instances to be added to the resource instances available for allocation to users in the future; and set a value of the supply based on the number of resource instances to be added to the resource instances available for allocation to users in the future.

5. A method, comprising:

configuring each of a plurality of computing devices to implement a plurality of resource instances of a provider network;

receiving, from a requestor, identification for selected computing assets requested to be removed from service, wherein each of the computing assets is one of the computing devices or a slot of one of the computing devices;

determining a number of resource instances hosted by the computing assets requested to be removed from service;

identifying a pool in which each of the computing assets requested to be removed from service is located;

for each identified pool:

determining which of the computing assets requested to be removed from service is approved for removal from service based on a number of the resource instances available for allocation to users after the computing assets are removed from service exceeding a predetermined number of resource instances; and notifying the requestor as to which of the computing assets is approved for removal from service; and remove from service the computing assets approved for removal from service.

6. The method of claim 5, wherein determining which of the computing assets is approved for removal from service comprises determining whether removal from service of the computing assets requested to be removed from service leaves the pool with at least the predetermined number of resource instances.

7. The method of claim 5, wherein determining which of the computing assets is approved for removal from service comprises:

determining a number of the resource instances that are currently allocated to users; and setting the predetermined number of resource instances based on the number of the resource instances that are currently allocated to users.

8. The method of claim 5, wherein determining which of the computing assets is approved for removal from service comprises:

determining a number of the resource instances that were historically allocated to users;

setting the predetermined number of resource instances based on the number of the resource instances that were historically allocated to users.

9. The method of claim 5, wherein determining which of the computing assets is approved for removal from service comprises:

determining a number of resource instances to be added to the resource instances available for allocation to users in the future; and setting the a number of the resource instances available for allocation to users after the computing assets are removed from service based on the number of resource instances to be added to the resource instances available for allocation to users in the future.

10. The method of claim 5, further comprising moving an application executing on one of the computing assets requested to be removed from service to a computing asset not requested to be removed from service.

11. The method of claim 5, wherein determining which of the computing assets is approved for removal from service comprises:

determining a number of the resource instances needed in the future to execute applications for users; and setting the predetermined number of resource instances based on the number of the resource instances needed in the future to execute applications users.

12. A system, comprising:

a plurality of computing devices, each of the computing devices configurable to host a plurality of resource instances of a provider network; and a computing device configured to implement an isolation manager that determines which computing assets to remove from service, the isolation manager configured to:

receive, from a requestor, identification for selected computing assets requested to be removed from service, wherein each of the computing assets is one of the computing devices or a slot of one of the computing devices;

determine a number of resource instances hosted by the computing assets requested to be removed from service;

identify a pool in which each of the computing assets requested to be removed from service is located;

for each identified pool:

determine which of the computing assets requested to be removed from service is approved for removal from service based on a number of the resource instances available for allocation to users after the computing assets are removed from service exceeding a predetermined number of resource instances; and notify the requestor as to which of the computing assets is approved for removal from service; and remove from service the computing assets approved for removal from service.

13. The system of claim 12, wherein the isolation manager is configured to determine whether removal from service of the computing assets requested to be removed from service leaves the pool with at least the predetermined number of resource instances.

14. The system of claim 12, wherein the isolation manager is configured to:

determine a number of the resource instances that are currently allocated to users; and set the predetermined number of resource instances based on the number of the resource instances that are currently allocated to users.

15. The system of claim 12, wherein the isolation manager is configured to:

determine a number of the resource instances that were historically allocated to users;

set the predetermined number of resource instances based on the number of the resource instances that were historically allocated to users.

16. The system of claim 15, wherein the number of resource instances that were historically allocated to users is determined as value of peak utilization of the resource instances in a time period selected as having utilization corresponding to an upcoming time period.

17. The system of claim 12, wherein the isolation manager is configured to:

determine a number of the resource instances needed in the future to execute applications for users; and set the predetermined number of resource instances based on the number of the resource instances needed in the future to execute applications users.

18. The system of claim 12, wherein the isolation manager is configured to:

determine a number of resource instances to be added to the resource instances available for allocation to users in the future; and set the a number of the resource instances available for allocation to users after the computing assets are removed from service based on the number of resource instances to be added to the resource instances available for allocation to users in the future.

19. The system of claim 12, wherein the isolation manager is configured to remove from service the computing assets approved for removal from service.

* * * * *